(12) United States Patent
Stava

(10) Patent No.: US 7,385,159 B2
(45) Date of Patent: Jun. 10, 2008

(54) OUTPUT STAGE FOR AN ELECTRIC ARC WELDER

(75) Inventor: Elliott K. Stava, Sagamore Hills, OH (US)

(73) Assignee: Lincoln Global, Inc., City of Industry, CA (US)

( * ) Notice: Subject to any disclaimer, the term of this patent is extended or adjusted under 35 U.S.C. 154(b) by 467 days.

(21) Appl. No.: 10/872,039

(22) Filed: Jun. 21, 2004

(65) Prior Publication Data

US 2005/0279742 A1   Dec. 22, 2005

(51) Int. Cl.
*B23K 9/073* (2006.01)

(52) U.S. Cl. ............................... 219/130.4; 219/130.51

(58) Field of Classification Search ............ 219/130.4, 219/130.51, 132, 137 PS
See application file for complete search history.

(56) References Cited

U.S. PATENT DOCUMENTS

| | | | |
|---|---|---|---|
| 3,328,637 A * | 6/1967 | Aldenhoff | ................ 219/130.4 |
| 4,450,340 A * | 5/1984 | Corrigall et al. | ............ 219/132 |
| 4,692,585 A * | 9/1987 | Zaruba et al. | ........... 219/130.4 |
| 4,897,522 A | 1/1990 | Bilczo | |
| 4,947,021 A | 8/1990 | Stava | |
| 4,963,715 A | 10/1990 | Tuttle | |
| 5,340,963 A | 8/1994 | Bodewigs | |
| 5,513,093 A | 4/1996 | Corrigall | |
| 6,111,216 A | 8/2000 | Stava | |
| 6,365,874 B1 | 4/2002 | Stava | |
| 6,723,957 B2 | 4/2004 | Holverson | |

* cited by examiner

*Primary Examiner*—Clifford C. Shaw
(74) *Attorney, Agent, or Firm*—Fay Sharpe LLP

(57) ABSTRACT

An auxiliary OCV boost circuit for the power source of an electric arc welder to perform a welding process between an electrode and a workpiece, which power source has a main positive voltage output with a first voltage and a main negative voltage output with a second voltage. The boost circuit comprises a source of positive boost voltage substantially greater than the first voltage, a first switch to add the positive boost voltage to the main positive voltage, a source of negative boost voltage substantially greater than the second voltage, a second switch to add the negative boot voltage to the main negative voltage and a switch control device activated to selectively enable the first and second switches. This OCV boost circuit can be selectively operated in DC mode wherein only the main and boost voltages of one polarity is implemented.

88 Claims, 12 Drawing Sheets

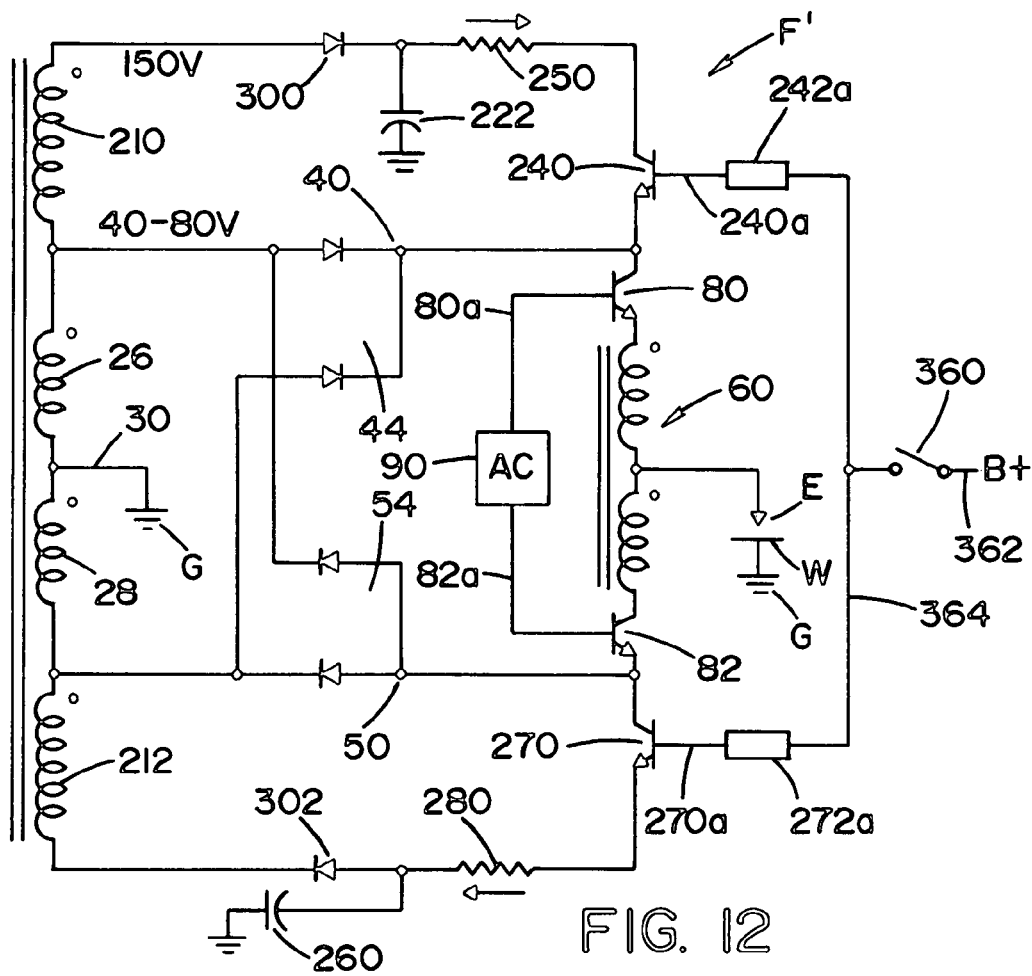
FIG. 12
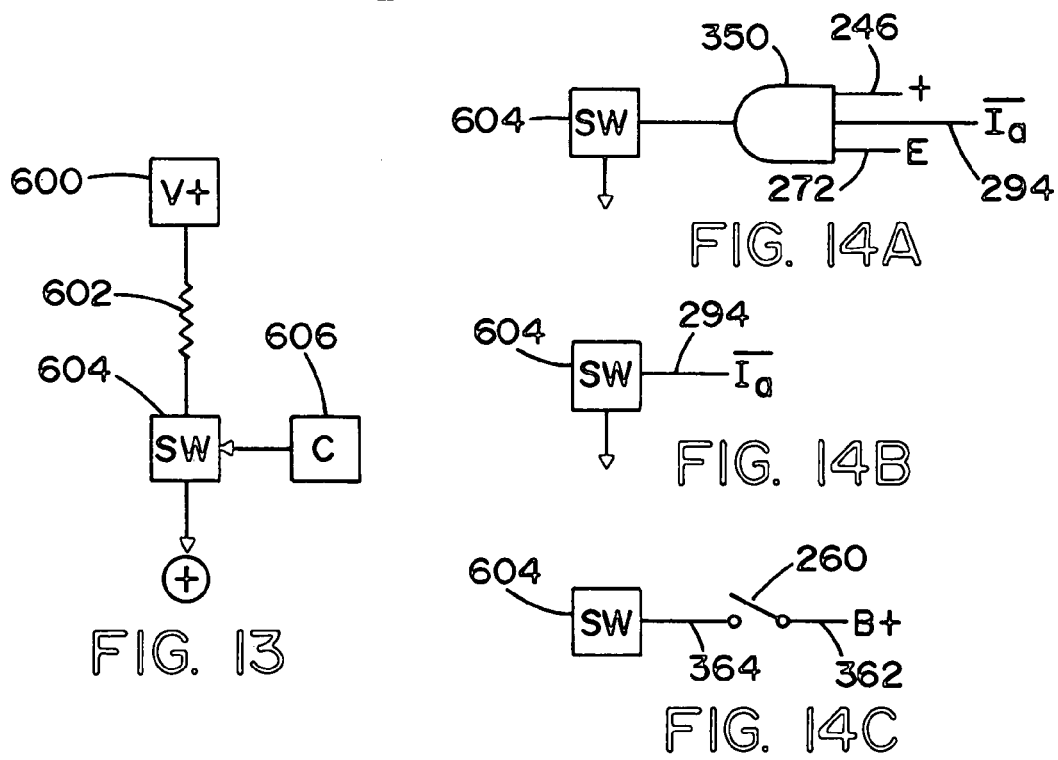
FIG. 13
FIG. 14A
FIG. 14B
FIG. 14C

OUTPUT STAGE FOR AN ELECTRIC ARC WELDER

The present invention relates to the art of electric arc welding and more particularly to a novel output stage for an electric welder to boost the OCV of the power source, especially for AC welding, such as AC TIG, AC MIG and AC submerged arc. The invention can be used in DC welding also.

INCORPORATION BY REFERENCE

The present invention is primarily directed to the output stage of an AC power source for an electric arc welder for performing an AC welding process, such as an AC TIG welding process or an AC MIG welding process and AC submerged arc welding. Power sources used for this type of welder have output stages that often involved a center tapped choke with alternating polarity switches on opposite sides of the choke where the electrode of the welding process is connected to the center tap of the choke. Prior patents showing this type of configuration are Stava U.S. Pat. No. 4,947,021; Bodewigs U.S. Pat. No. 5,340,963; Corrigall U.S. Pat. No. 5,513,093, and Holverson U.S. Pat. No. 6,723,957. These output stages using center tapped chokes are well known in the welding field and are incorporated by reference herein as background information relating to an AC welder of the type to which the present invention is particularly applicable. The output stage of a power source as described in the patents mentioned above is sometimes modified to place the choke in the common line between the center tap and the electrode. Both the positive and negative currents flow in opposite direction through the same choke, instead of flowing in only designated sections of a center tapped choke. The use of a common choke is shown in Stava U.S. Pat. No. 6,365,874, which patent also describes the relationship between a common choke and a center tapped choke in several embodiments of AC output stages. This Stava patent is also incorporated herein as background information relating to relevant AC output stages for a generic inverter type power source. The invention involves the selective actuation of a positive and negative boost circuit to increase the open circuit voltage (OCV) at least when a polarity change occurs. This is especially helpful at low current welding. A relevant background patent to this general concept, is Bilczo U.S. Pat. No. 4,897,522 illustrating a center tapped choke together with a common choke and having a continuously operated boost winding in the output stage of a DC welder. This patent is incorporated by reference herein as background information although, it is limited to a DC welder instead of an AC welder constituting the primary use of the invention.

BACKGROUND OF INVENTION

Increasing the circuit voltage of a power source used for arc welding greatly improves the welding performance and arc stability of the process. This is especially true for AC welding operations where output circuit is commanded to switch between positive and negative polarity. In this situation, it is important to reestablish the arc immediately upon polarity reversal, both positive and negative to positive, in order to maintain arc stability in the AC welding process whether it is AC TIG or AC MIG. This is also true in AC submerged arc welding. As described in prior patents, the background technology for AC welding often involves an output stage having a center tapped choke. The purpose of this choke is well known and operates well under most applications. The choke arrangement utilizes the stored energy in the core of the choke to maintain current flow in the same direction in both sections of the center tapped choke irrespective of the actual welding polarity. In theory, the center tapped choke develops whatever voltage is required to maintain the current flow in either the positive or negative direction. The limitation of this design is the amount of stored energy available to reignite the welding arc at the moment of polarity reversal. The stored energy is proportional to the square of the current through the sections of the center tapped choke multiplied by ½ the inductance of the choke. In most AC welding applications, this energy is more than adequate to reignite or reestablish the welding arc when there is a change in polarity. However, there are conditions where there is not enough energy to consistently reignite the arc; therefore, the center tapped choke must be quite large to accomplish more energy storage. Larger chokes are more costly and they also impede the welding performance of AC welding. In some instances, when the choke is on the common leg of the output circuit, energy must be dissipated during each polarity cycle of the AC welding process. In this situation, there is not enough energy to reestablish consistently the arc at polarity reversals. Thus, there is a need for an output stage or circuit to assure sufficient open circuit voltage to reignite the arc in opposite directions during polarity reversal and AC welding process without merely increasing the capacity of the power source during the output circuit.

The main welding output of a standard power source used for electric arc welding (this phrase includes plasma arc cutting) usually develops an open circuit voltage of less than about 80 volts. The typical arc voltage is usually less than 30 volts. Thus, at reversal of polarity, there is only about 50 volts open circuit voltage to reestablish the arc. In addition to this 50 volts would be the voltage produced by the output choke. This total voltage, however, is sometimes insufficient to reestablish the welding arc. This is especially true at low current welding operations, such as welding at less than 10 amperes as is common in AC TIG welding. Low open circuit voltage for the power source creates high efficiency; however, the power source has difficulty maintaining the welding arc especially at longer arc lengths. For instance, in short arc welding, a low open circuit voltage is generally not enough to reignite consistently the arc at polarity reversals. Consequently, the output voltage for a power source, especially for AC MIG welding, must be high enough to maintain the arc during times of long arc lengths. Furthermore, higher voltage output from the power source inverter reduces the efficiency of the inverter. However, there is a need for a higher open circuit voltage, especially at polarity reversal in AC welding process. A solution would be to increase the open circuit voltage of the main output circuit of the power source. This is expensive and drastically reduces the efficiency of the power source. Consequently, the need for a high open circuit voltage for a standard AC welding presents a dilemma. Furthermore, a high open circuit voltage should not be available at the output terminals of the inverter used as the power source when the inverter is not driving a welding operation. There is a need for a circuit to provide high open circuit voltage for an AC welding process when high open circuit voltage for the power source itself is not sufficient. These needs are solved efficiently by the present invention relating to a novel output stage or output circuit for the power source of an electric arc welder capable of AC welding.

THE INVENTION

In accordance with the invention, there is provided additional boost windings with rectifiers and current limiting resistors together with control switches that are enabled or activated as needed to increase the open circuit voltage at particular instances in the welding process. The term "enable" or "activated" means that the switches can be operated in accordance with commands to the main switches in the AC output circuit of the power source or are merely closed. A separate positive and negative auxiliary boost voltage source is selectively switched to be added to the main positive or main negative voltage of the power source. A resistor in the separate auxiliary boost voltage sources limit the current in the separate sources to less than 20 amperes and preferably less than about 5 amperes. The voltage of the auxiliary separate boost voltage sources is in the general range of at least 100 volts. Consequently, whenever the separate voltage sources are switched into the output circuit of the main power source the open circuit voltage is high; however, very little current is provided at the high voltage. The high open circuit voltage merely assures reignition of the arc at polarity reversals in an AC welding process. The added voltage is a factor in the process; but, the added current is insignificant. Of course, an auxiliary open circuit voltage boost is advantageous in a number of welding processes; therefore, the control switches in the auxiliary separate positive and negative voltage sources are enabled, i.e. activated, to be operated whenever it is necessary to have a higher or open circuit voltage than is available as the main output voltage terminals of the power source used for driving the welder. Consequently, the invention relates to a positive and negative auxiliary boost voltage source having a current limiting resistor and a switch which is enabled or activated for operation at the times when there is a need for higher open circuit voltage.

In accordance with the present invention there is provided a converter or output stage for an electric arc welder used to weld at a gap between an electrode and a workpiece when a trigger switch is closed. This output stage has a first input terminal connected to an output terminal of a power source, with a positive voltage having a magnitude and a first amperage range. A second input terminal is connected to an output terminal of the power source, with a negative voltage having a second magnitude and a second amperage range. An auxiliary positive voltage supply with a positive voltage substantially greater than the main positive voltage and a positive current drastically less than the first amperage range, an auxiliary negative voltage supply with a negative voltage substantially greater than the main negative voltage and a negative current drastically less than the second amperage range, a first switch connecting the main positive voltage across the gap, a second switch for connecting the main negative voltage across a gap, and a polarity control device for alternately operating the first and second switches to produce an AC welding current across the gap. A third switch adds the auxiliary positive voltage to the main positive voltage. A fourth switch adds the auxiliary negative voltage to the main negative voltage. Then, a switch control device is activated to selectively enable the third and fourth switches for operation in unison with the first and second switches, respectively. The "enable" function can be actual closing of the third and fourth switches or merely conditioning the switches to be operated in unison with the first and second switches during AC the welding process. In one aspect of the invention, the switch control device is activated when the trigger switch is closed. In other words, when the welder is to be operated, the switch control device is enabled so that these third and fourth switches can be operated in unison with the first and second switches. In accordance with another aspect of the invention, there is a delay between the closing of the trigger switch and activation of the switch control device. This delay allows operation of the welder for a few cycles prior to activating the switch control device to allow operation of the auxiliary switches by themselves or in conjunction with the main switches. The term "enable" means that the switches can be or are operated. Indeed, in some instances when the switch control device is enabled the switches themselves are closed to apply the auxiliary voltage directly to the main switches of the output circuit or converter of the electric arc welder.

In accordance with an aspect of the invention, a resistor in series with the auxiliary boost voltage supplies limit the current to a level substantially less than 20 amperes and preferably less than about 5 amperes. The auxiliary voltage supplies have a voltage greater than 100 volts to increase the open circuit voltage to a level 100 volts higher than the open circuit voltage of the main output terminals of the power source. By providing low current in the auxiliary boost voltage circuits, the open circuit voltage is increased, but the current is low.

In accordance with another aspect of the invention, the two main positive and negative voltages are provided by secondary windings on the output transformer of a standard power source. The auxiliary voltage sources are preferably additional secondary windings or a secondary winding on the output transformer of the power source; however, the auxiliary voltages can be provided by separate transformers or even by an appropriate battery stack. The invention is primarily applicable to AC welding, such as AC TIG, AC MIG or AC submerged arc; however, the open circuit voltage increase obtainable by using the present invention is applicable to some welding operations where DC positive or DC negative is used by operating only the positive or the negative switches of an output stage.

In accordance with another aspect of the present invention, the output converter or output stage of the present invention has an output center tapped choke with a first switch in series with one section of the choke and a second switch in series with the other, second section of the choke. Of course, a single common choke can be used in combination with a center tapped choke or as the only energy storing component in the output stage of the present invention.

In accordance with another aspect of the present invention, there is provided a circuit to boost the OCV of the power source for an electric arc welder for welding across a gap between an electrode and a workpiece, when a trigger switch is activated, i.e. closed. The welder has a positive open circuit voltage of a first magnitude and a negative open circuit voltage of a second magnitude. The circuit includes an auxiliary voltage source of a third magnitude with a selectively operated switch to connect the auxiliary voltage source in series with one of the open circuit voltages. A switch control device operates the selectively operable switch. In accordance with this aspect of the invention, there is a second auxiliary voltage source with a fourth given magnitude. The selectively operated switch includes a second switch to connect the second auxiliary source in series with another of the open circuit voltages. In accordance with this aspect of the invention, the OCV of the main positive and negative voltage of another power source are increased by adding the auxiliary boost voltage to one or both of the main voltage sources.

In accordance with another aspect of the present invention there is provided an output stage for power source of an electric arc welder for performing a welding process between an electrode and a workpiece when a trigger switch is closed. The output stage comprising a first polarity circuit in series with the electrode and workpiece, the first circuit includes a first main power source with a first voltage and a first main switch operated by a first switch signal. A second polarity circuit is provided in series with the electrode and the workpiece and includes a second main power supply with a second main voltage and a second main switch operated by a second switch signal. An AC controller alternately creates the first and second switch signals to perform an AC welding process between the electrode and workpiece. An auxiliary first polarity circuit includes a first auxiliary voltage source additive to the first main supply and a first auxiliary switch in series with the first main switch and operated by a first boost signal. A second polarity circuit is provided including a second auxiliary voltage source additive to the second main supply and a second auxiliary switch in series with the second main switch and operable by a second boost signal. A boost controller is used for selectively creating the first boost signal during operation of the first switch signal and the second boost signal during operation of the second switch signal. These boost signals may be used to enable the switches or to actually close the switches in accordance with various implementations of the present invention.

Still a further aspect of the invention is the provision of a method of AC arc welding including applying a main positive voltage across an electrode and workpiece, applying a main negative voltage across the electrode and workpiece and alternating the positive and negative voltages across the electrode and workpiece. The method then applies a positive high voltage across the electrode and workpiece concurrently with the main positive voltage and an auxiliary high negative voltage across the electrode and workpiece concurrent with the main negative voltage. In accordance with this method, the current of the auxiliary voltages is less than about 20 amperes. The auxiliary voltages are substantially greater, than the main voltages and the current of the auxiliary power sources is drastically less than the main voltages.

In accordance with another aspect of the present invention there is provided an auxiliary OCV boost circuit for the output circuit of an electric arc welder to perform a welding process between an electrode and a workpiece. The power source has a main voltage output with a first voltage and a main negative voltage output with the second voltage. The boost circuit comprises a source of positive voltage substantially greater than the first voltage, a first switch to add the positive boost voltage to the main positive voltage, a source of negative voltage substantially greater than the second voltage, a second switch to add the negative boost voltage to the main negative voltage and a switch control device to selectively enable the first and second switches. Again, the term "enable" is broadly used to operate and/or condition the operation of the first and second switches.

The primary object of the present invention is the provision of an output converter or output stage for a power source used in an electric arc welder, which converter or output stage selectively increases the open circuit voltage of the power source in both the positive and negative directions, especially for the purpose of reigniting an arc during the polarity reversal in an AC welding process. The invention can also be used in DC welding.

Yet another object of the present invention is the provision of a converter or output stage, as defined above, which converter and output stage allows the use of a substantially smaller choke and can be used in various output circuits of an electric arc welder.

Still another object of the present invention is the provision of a converter or output stage, as defined above, which converter or output stage increases the open circuit voltage of the power source selectively when required by the welding process being performed.

A further object of the present invention is the provision of a method for electric arc welding, which method adds a voltage to the positive main voltage of a power source and adds a negative voltage to the main negative output voltage of the power source with switches for the purposes of adding the voltages at selected times during the welding process.

These and other objects and advantages will become apparent from the following description taken together with the accompanying drawings.

BRIEF DESCRIPTION OF DRAWINGS

FIG. 12 is a wiring diagram illustrating an embodiment of the invention wherein the boost windings are selectively activated and deactivated when there is a welding process being performed;

FIG. 13 is a simplified, schematic block diagram illustrating a broad aspect of the present invention; and, FIGS. 14A, 14B and 14C are logic diagrams showing operation of the broad aspect of the invention as shown schematically in FIG. 13.

PREFERRED EMBODIMENTS

Figure 1:
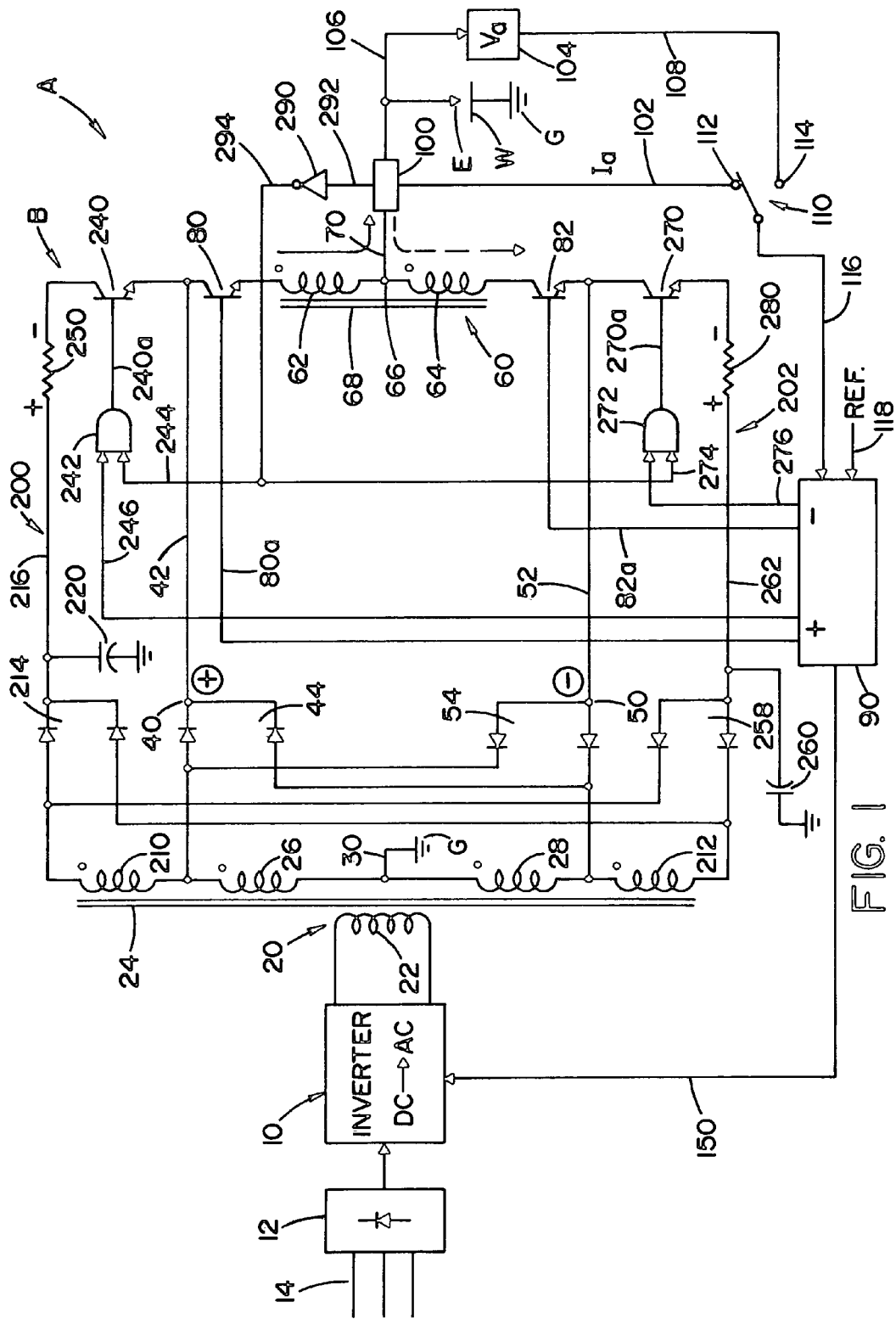
FIG. 1 is a wiring diagram, combined with a block diagram, disclosing the preferred embodiment of the present invention.
Figure 1A:
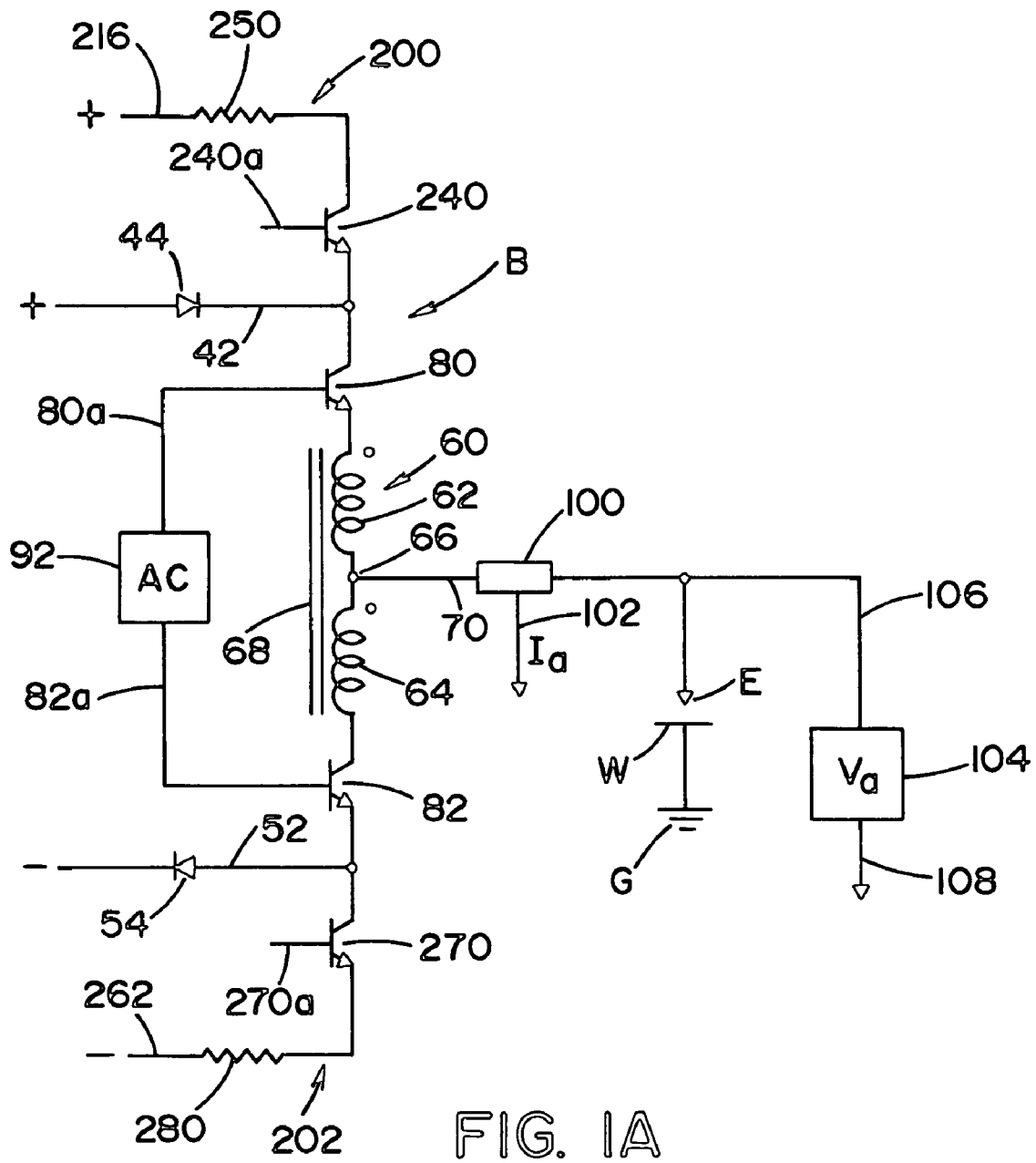
FIG. 1A is a partial wiring diagram illustrating a simplified description of the preferred embodiment of FIG. 1.
Figure 1B:
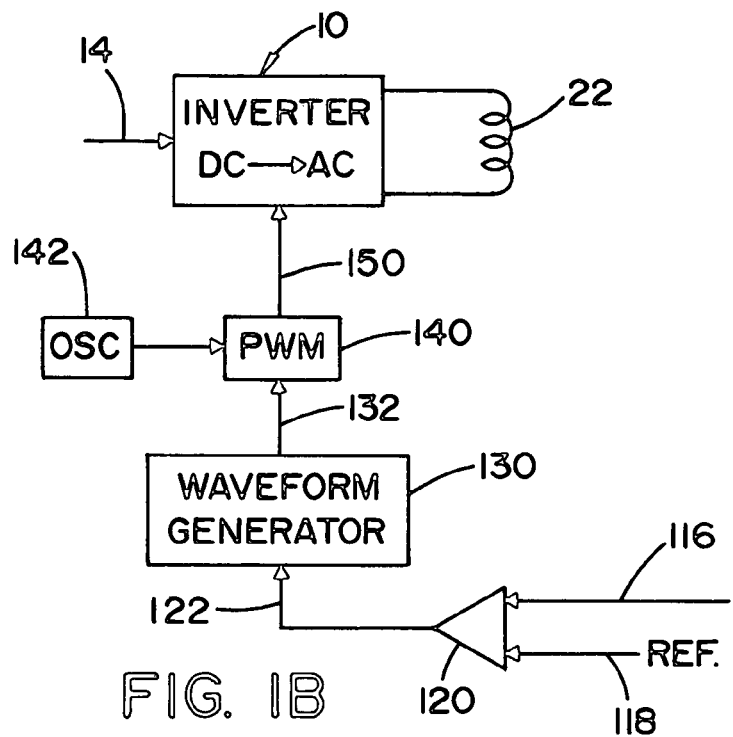
FIG. 1B is a block diagram of certain elements in the controller of the preferred embodiment shown in FIG. 1.
Figure 2:
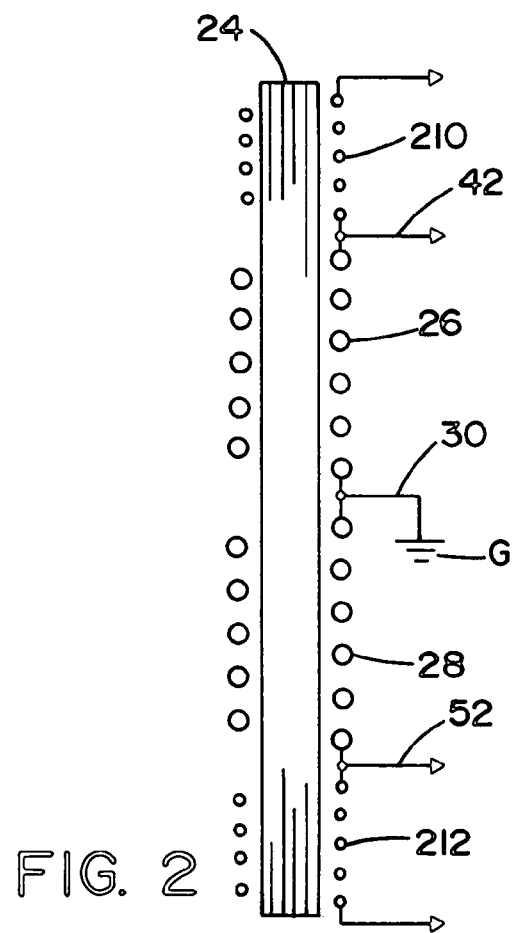
FIG. 2 is an enlarged partial cross-sectional view of a transformer showing the secondary windings used in the preferred embodiment of the present invention.

The present invention is an improvement in an electric arc welder of the type normally used in AC TIG welding and AC MIG welding. Such a welder A is shown as welder A in FIGS. 1, 1A, 1B and 2. A high switching speed inverter 10 having an input rectifier 12 driven by a standard power supply 14 illustrated as a three phase line voltage input supply. In accordance with standard technology a power factor preregulator can be inserted between rectifier 12 and high switching speed inverter 10. Output transformer 20 has primary winding 22, core 24 and secondary main sections 26, 28 connected in series with a center ground tap 30. Winding sections 26 and 28 drive rectifier section 44 to provide a positive output voltage terminal 40 connected to output lead 42. The positive voltage has a given magnitude generally less than 100 volts at terminal 40. When welding, the main positive voltage is less than 50 volts and close to 30 volts. In a like manner, main transformer secondary sections 26 and 28 control the main negative voltage on terminal 50 connected to output lead 52. The main negative voltage is produced by rectifier section 54. The full wave rectifier of sections 44 and 54 is standard, as are main terminals 40, 50. In the preferred embodiment of the invention shown in FIG. 1, sections 44, 54 are full wave rectifiers to provide positive and negative main voltage at terminals 40, 50. The current available at the terminals has a high range greater than 50-100 amperes as necessary for electric arc welding. In accordance with the preferred implementation of the present invention, output converter or output stage B is connected to terminals 40, 50 for the purpose of providing alternating current to center tapped choke 60 having a positive winding section 62 and a negative winding section 64 with a center tap 66 and standard core 68. Center tap choke 60 is connected to output lead 70 in series with electrode E and workpiece W connected to ground G. To pass a positive current across the gap between electrode E and workpiece W, main polarity switch 80 is connected between lead 42 and positive core section 62 so a gating signal on line 80a connects terminal 40 in series with section 62, electrode E and workpiece W as shown by the solid line arrow in FIG. 1. Negative voltage is applied across electrode E and workpiece W by closing main polarity switch 82 upon receipt of a gate signal on line 82a. The flow of negative current is indicated by the dashed line arrow in FIG. 1. As so far described, circuit B at the output of the power source for welder A is standard technology used in AC welders. FIG. 1A is a general showing of the output stage or converter B without unnecessary details of the input side of the circuit. The invention operates with various types of input power sources. FIG. 1B schematically represents the control architecture used in controller 90 that creates alternating gating pulses in leads 80a, 82a as well as the feedback loop and control technique for inverter 10. Controller 90 include an internal gate generating circuit 92 schematically illustrated in FIG. 1A. This circuit creates alternating gating pulses in lines 80a, 82a at the desired frequency of the AC welding process. Furthermore, controller 90 receives feedback commands from a current shunt 100 used to create a voltage representative of the arc current in line 102. In a like manner, the voltage on electrode E is sensed on line 106 and read by converter 104 to create a voltage representative of the arc voltage in line 108. Lines 102 and 108 are directed to a selector switch 110 having a current terminal 112 and a voltage terminal 114. As shown in FIG. 1, the feedback signal is applied on line 116 by switch 110. In the illustrated position of switch 110, the control loop is a current feedback driven by shunt 100. If the control loop of controller 90 is to be used in a voltage mode, selector switch 110 is moved to terminal 114 for reading the voltage level on line 108. In this manner, the signal on line 116 is the electrode voltage, which voltage is compared to a reference voltage on line 118 by error amplifier 120 having an output 122. The preferred embodiment of the invention uses waveform technology pioneered by The Lincoln Electric Company of Cleveland, Ohio. This type of control involves a waveform generator 130 to generate an output profile signal in line 132 directed to the input of pulse width modulator 140 operated at a frequency controlled by oscillator 142 to produce a large number of small current pulses in line 150, which current pulses have a profile determined by the particular waveform set into generator 130. This control is standard waveform technology used routinely for controlling high switching speed inverters. Other architecture could be used for controlling inverter 10 to produce the desired waveforms during the positive and negative portions of the welding process. Controller 90 sets the polarity of current during the welding process by alternating the logic on lines 80a, 82a which lines are operated alternately by controller 90. Furthermore, an output signal on line 150 allows controller 90 to control the voltage level or output current at the terminals 40, 50 by controlling the phase shift or duty cycle of the alternately closed switches in inverter 10. These inverter switches operate at relatively high frequency which is normally the same frequency of oscillator 142 controlling the output of pulse width modulator 140. As shown in FIG. 2, core 24 which is used to support primary winding 22, not shown, has large conductors for secondary winding sections 26 and 28. High current, at relatively low voltage is produced at terminals 40, 50 and on leads 42, 52. As so far described, output stage or converter B shown in FIGS. 1, 1A, 1B and 2 is a standard circuit with the normal components used in converting low OCV voltages into an AC arc welding process. The voltage at terminals 40, 50 is generally less than 50 volts when welding and less than 100 volts when plasma cutting. A high current range is delivered by windings 26, 28. In practice the welding current can be over 200 amperes. In this manner, electric arc welding is performed at a low voltage and high current with polarity determined by the polarity gating circuit 92, shown in FIG. 1A. Operation of the common output stage, as so far described, can cause arc instability. Indeed, the arc can be extinguished as there is polarity reversal by output stage B. This problem is accentuated at lower current operations for both AC TIG welding and AC MIG welding.

In accordance with the present invention converter or output stage B includes a positive and negative auxiliary OCV boost circuit for both the positive voltage terminal 40 and the negative voltage terminal 50. Positive auxiliary boost circuit 200 includes a high voltage source illustrated in the preferred embodiment as two additional sections 210, 212 of transformer 20. These windings have a greater number of turns to give an increased voltage and are reduced in size since a low current is provided by these windings. Windings 210, 212 are directed to a full wave rectifier section 214 connected to the positive terminal of capacitor 220 so that the voltage on capacitor 220 is a high voltage generally above 100 volts. Lead 216 is at a voltage substantially greater than the main power source voltage on terminal 40. The auxiliary boost voltage is determined by the output of the full wave rectifier driven by windings 210, 212. Of course, these two windings are shown as separate windings; however, they could be a single winding for driving circuit 200. The term secondary winding for providing a high voltage power source includes one or more secondary winding sections of transformer 20. The voltage across grounded capacitor 220 is added to the voltage at terminal 40 by an auxiliary boost switch 240 having a gate 240a created as the output of operating logic device 242, shown as an AND gate. The logic device has two inputs which must be a logic one or true to create a signal in gate 240a. Thus, one of the input leads 244 is considered to be an enable lead and the other lead 246 is an operating lead. These functions could be reversed. Of course, there could be a single operating lead that would more enable or cause an output logic device 242. Operating input 246 is the output of controller 90 which is logic one or true when positive switch 80 is gated by a signal on line 80a. The logic on lines 80a and 246 are the same in this embodiment of the invention. To limit the current in auxiliary boost circuit 200 to a level less than 200 amperes and preferably less than about 5 amperes, there is a resistor 250 in series with auxiliary boost switch 240. When device 242 is enabled by a signal on line 244, switches 80, 240 operate in series and in unison to add the high voltage on grounded capacitor 220 with the relatively low voltage on the main output terminal 40. Thus, when there is a signal on line 244 enabling device 242, a signal on line 246 closes auxiliary boost switch 240 for adding a high boost voltage to the normal low voltage from the power source.

Negative auxiliary OCV boost circuit 202 is essentially the same as circuit 200. An high negative voltage, low current is created by a winding on transformer 20 indicated to be two sections 210, 212 in the preferred embodiment. These winding sections provide a high voltage, low current that is a voltage at terminal 50 that is negative as controlled by rectifier section 258. Thus, a high negative voltage is applied across capacitor 260 between terminal 50 and lead 262. The voltage on grounded capacitor 260 is essentially the same as the voltage on grounded capacitor 220, as previously described. Thus, auxiliary boost switch 270 is closed by a gating signal in line 270a from operating logic device 272 having an enabling input 274 and an operating input 276. This operating input is coordinated with the signal on gate line 82a of main negative switch 82. Gate leads 80a and 246 are normally the same logic and are activated when circuit B is in positive polarity. In a like manner, lines 82a and 276 are essentially the same lead and are operative when circuit B is shifted to negative polarity. Resistor 280 in circuit 202 limits the already low current in circuit 202 to a level less than 20 amperes and preferably less than about 5 amperes. Winding sections 210, 212 produce high voltage and low current. Resistors 250, 280 limit the low current to even a reduced controlled level.

Circuit B can operate with boost switches 240, 270 operated at all times so that there is always an added open circuit voltage during a welding process. However, in accordance with the preferred embodiment of the invention, switches 240, 270 are employed to assure that an arc is reignited at polarity reversals. Thus, if there is current flow through shunt 100 there is an arc and, in the preferred embodiment, there is no need for closing auxiliary boost switches 240, 270. To effect this operating scheme, logic inverter 290 has an input 292 that determines when there is a certain level of current in shunt 100. This level is near or at zero. When there is no current flow or little current flow, there is no arc and switches 240, 270 are activated or closed. The logic on line 292 is inverted to an opposite logic on line 294. A signal on line 294 indicates that there is no arc. Thus, a logic on line 294 enables lines 244, 274 to show there is no arc across electrode E and workpiece W. The preferred embodiment of the present invention causes lines 244, 272 to enable devices 242, 272 when there is no arc. This event applies a high voltage from grounded capacitors 220, 260 in series with the relatively low welding voltage at terminals 40, 50. The arc is relit. The arc is stabilized, even during low current operation.

Figure 3:
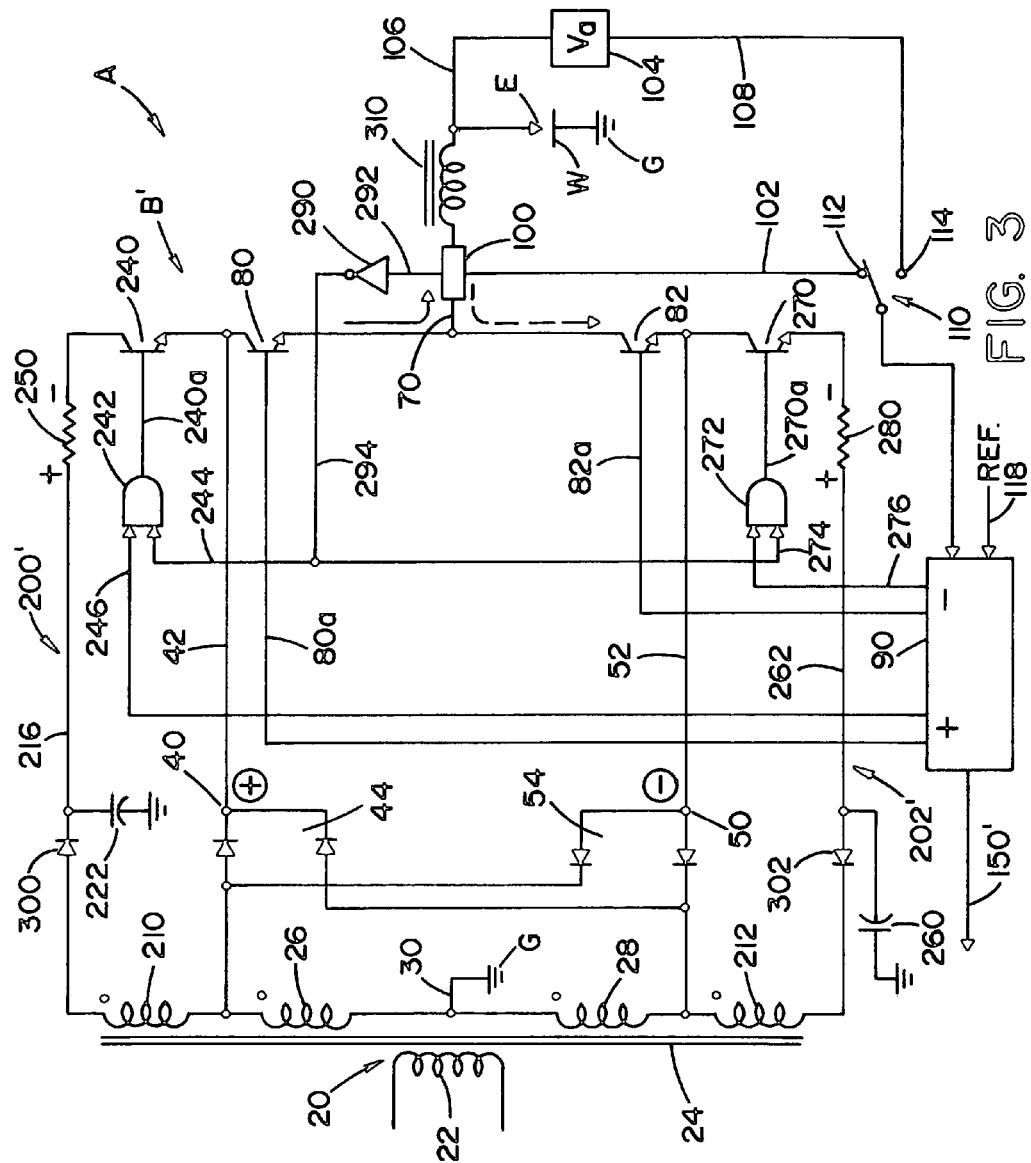
FIG. 3 is a wiring diagram illustrating another embodiment of the present invention.

The invention is the concept of selectively adding a high voltage, low current boost during the positive and/or negative polarity portion of a welding operation by the main power source. FIG. 1 shows inverter output stage or circuit B used for welder A using an inverter controlled by waveform technology as pioneered by The Lincoln Electric Company. Various other power sources can be used to drive primary winding 22 of transformer 20 such as an SCR input. Indeed, as will be shown later, the main power source can be defined as a power generating device to provide low voltage high current at terminals 40, 50. Furthermore, several changes can be made in circuit B without departing from the basic inventive concept. Some minor changes are illustrated in FIG. 3 wherein converter, output stage or circuit B' is functionally the same as circuit B; however, positive auxiliary boost circuit 200' has a half wave rectifier in the form of a single diode 300. In a like manner, auxiliary negative boost circuit 202' includes a half wave rectifier in the form of diode 302. The voltage across capacitor 222 is obtained from single secondary winding 210, while the voltage across capacitor 260 is obtained by single winding 212. Thus, the use of the secondary winding of transformer 20 can involve use of a single winding or two separate winding sections, as illustrated in FIG. 1. The input to primary 22 is a generic power source; consequently, the output of controller 90 is a line 150' merely tailored to the type of input power source providing high positive and negative voltages. In the preferred embodiment, the control architecture is shown in FIG. 1B since the preferred power source is a high switching speed inverter where the signal on line 150 or generic control line 150' is a series of short current pulses having a frequency greater than 18 kHz and a profile controlled by a waveform generator. Circuit B' does not use the preferred center tapped choke 60. To store energy for the arc in a given polarity, choke 310 is located in the common lead 70 in series with electrode E. When this concept is employed, current tends to maintain flow in the reverse direction at polarity reversal and, therefore, increases the desirability of using the present invention. FIG. 3 is merely added to the disclosure to show certain equivalent structures where circuit B' can be slightly modified to use half wave rectifiers and a common choke while still practicing the inventive concept. The output stage or circuit B or circuit B' can be operated for DC welding by using only one of the main power switches 80 or 82 and its corresponding auxiliary boost switch 240, 270, respectively.

Figure 4:
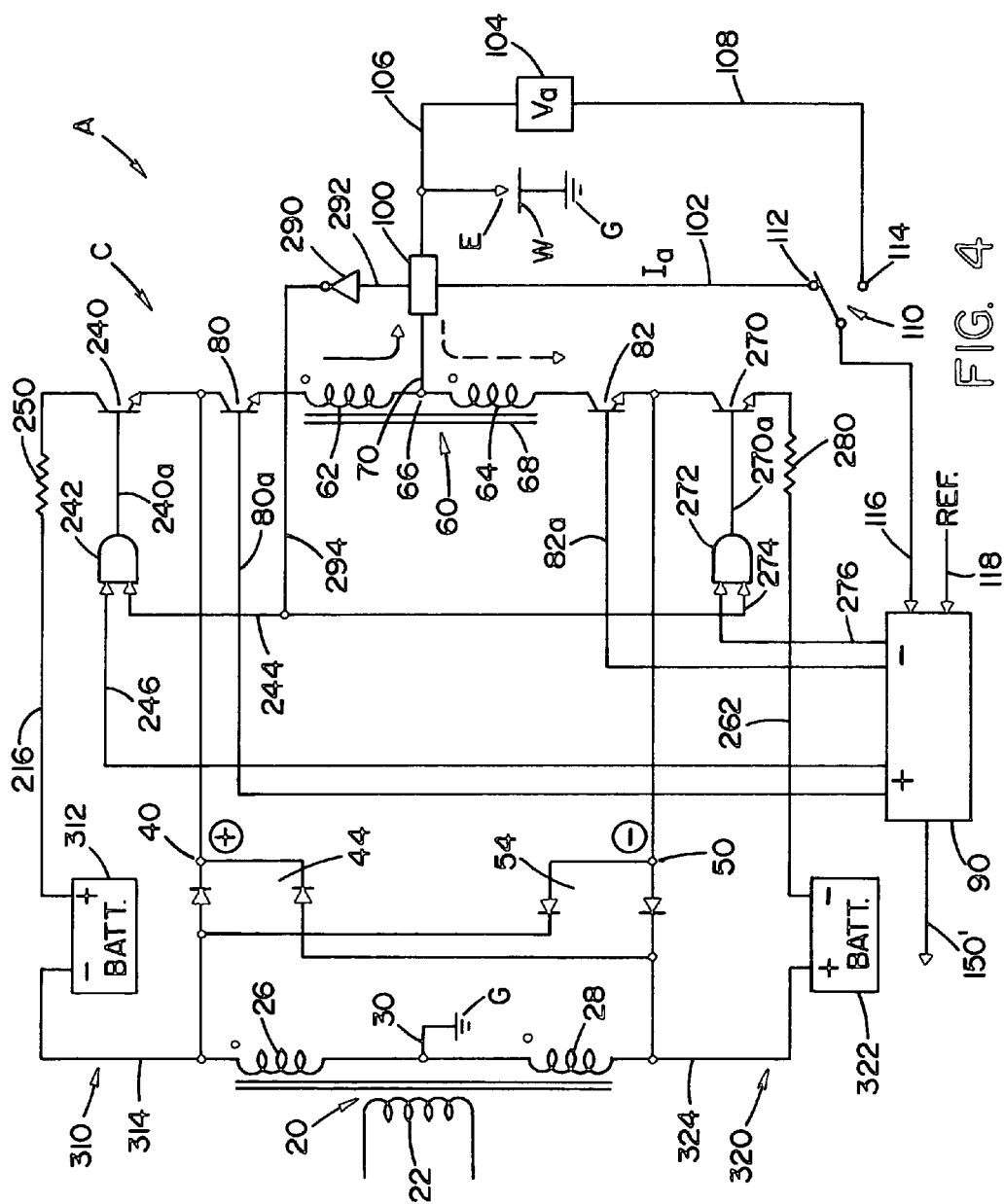
FIG. 4 is a wiring diagram illustrating still another embodiment of the invention utilizing external batteries.
Figure 5:
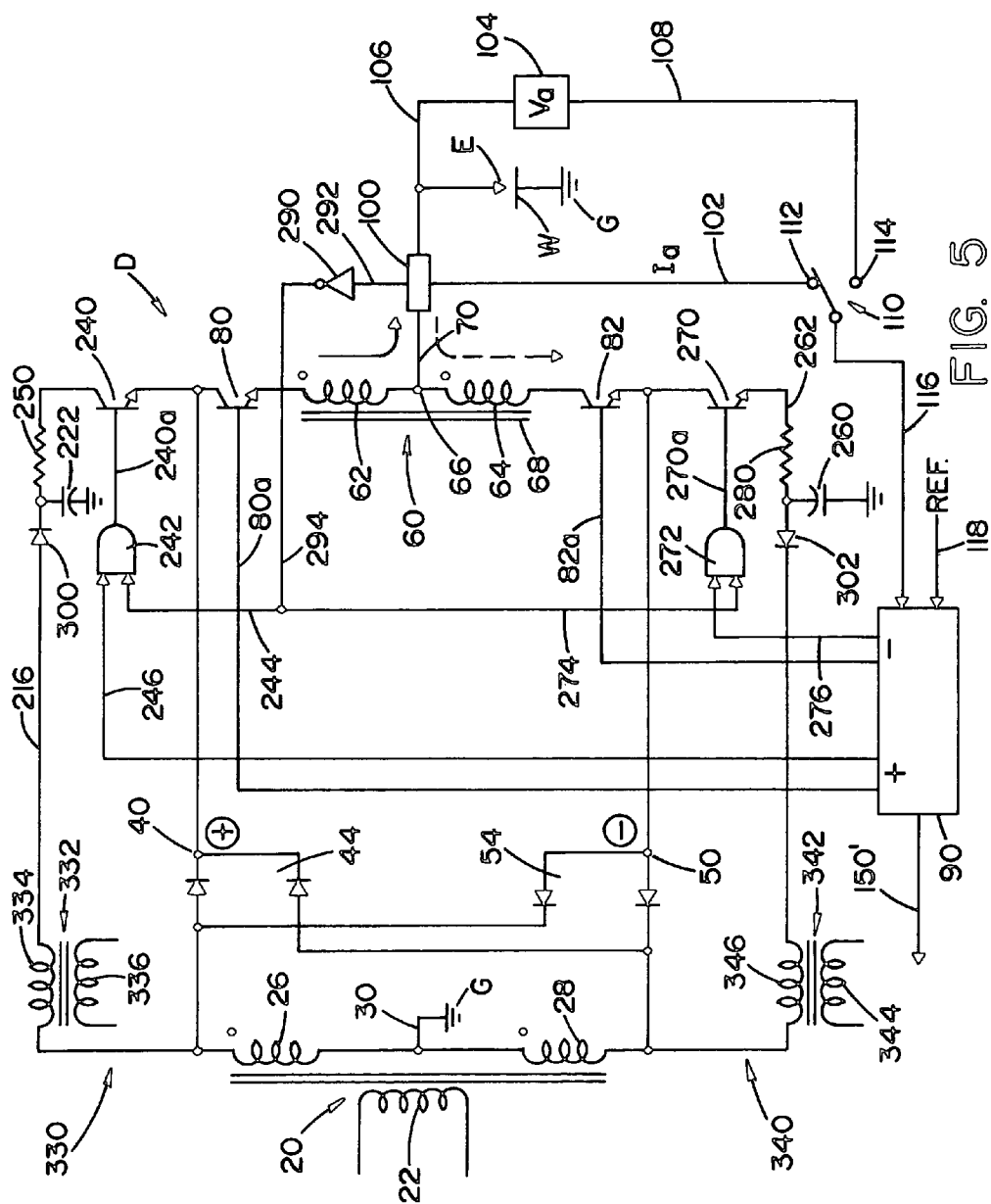
FIG. 5 is a wiring diagram of a further embodiment of the invention utilizing separate transformers.
Figure 6:
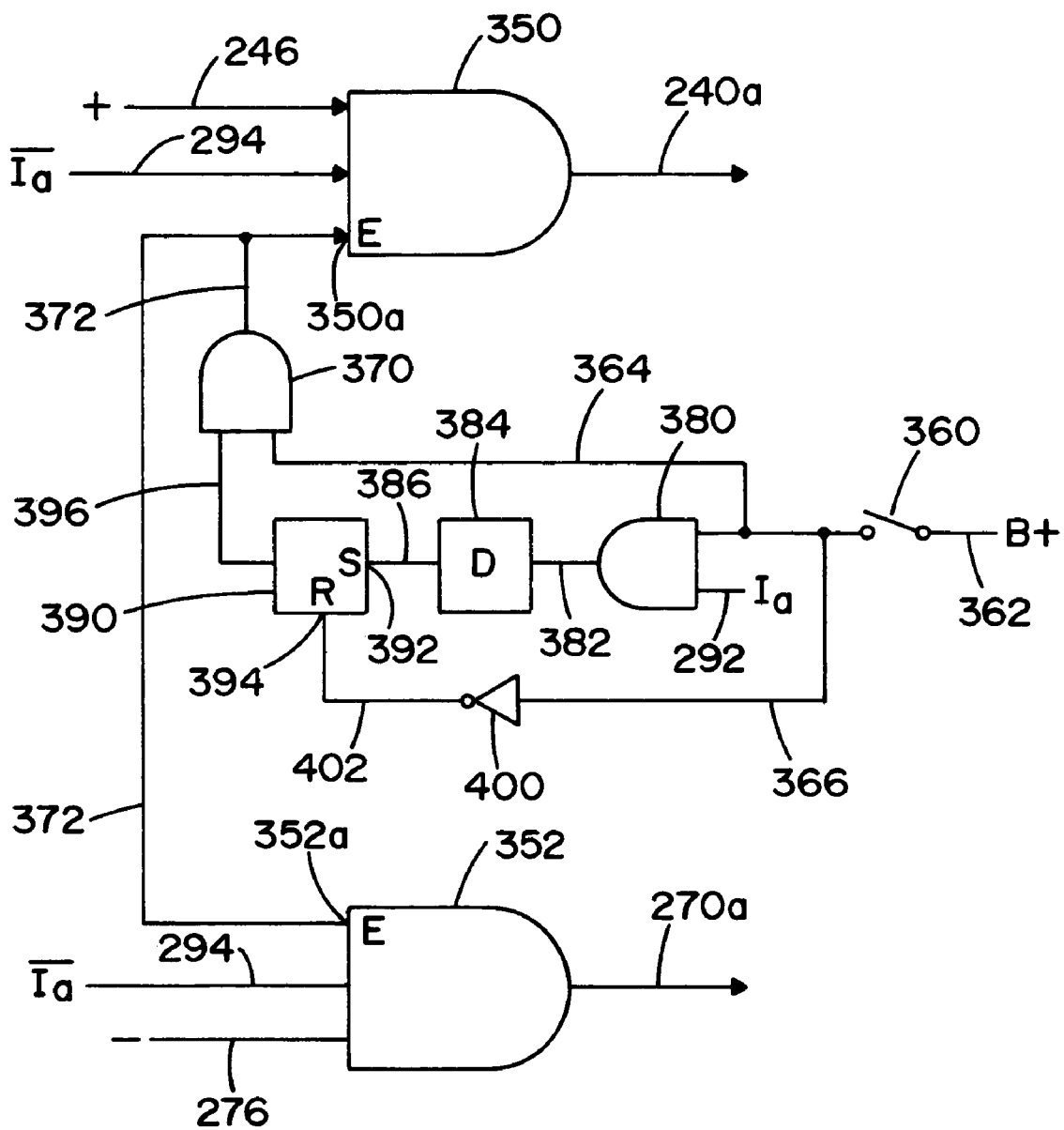
FIG. 6 is a logic diagram of one scheme used to enable or activate the auxiliary boost switches in the present invention.

The embodiment of the invention illustrated in FIG. 1 is slightly modified as shown in FIG. 4 where the positive auxiliary boost circuit 200 is replaced by circuit 310 where the high voltage supplemental power supply is in the form of a battery or battery stack 312 connected to winding section 26 of transformer 20. The negative auxiliary boost circuit 320 is substantially the same as circuit 310 and includes a battery stack 322 connected to the negative end of winding 28 by lead 324. There is no need for a grounded capacitor in the boost circuit. Converter, output stage or circuit C operates substantially the same as circuit B' in FIG. 3 and circuit B in FIG. 1. Another slight modification of the preferred embodiment of the invention is illustrated in FIG. 5, where circuit D is substantially the same as circuits B and C. Circuit D includes a positive auxiliary boost circuit 330 employing a separate transformer 332 having a primary 336 and a secondary 334 in series with line 216 to charge grounded capacitor 222 through diode 300. Otherwise, the auxiliary boost circuit is the same as previously described. The negative auxiliary boost circuit 340 includes a separate transformer 342 having a primary 344 and secondary 346 to charge grounded capacitor 260 by diode 302. Secondary windings of transformers 332, 342 are in series with diodes 300, 302, respectively, to provide a high voltage selectively added to the voltage of output terminals 40, 50 for increasing the open circuit voltage during positive and negative polarities of the welding process. Another modification of the preferred embodiment involves a slight change in the operating logic devices for creating the auxiliary boost switch gate signals in lines 240a, 270a. Modified logic devices are illustrated in FIG. 6 where logic devices 350, 352 create the positive and negative switching gate signals in lines 240a, 270a, as previously described. The logic devices are enabled or operated by a number of signals which must all be true to close switches 240, 270. This feature will be described later. But, as a general proposition, the invention can use a single input signal to close the switches. Then an input to the logic devices merely gates or closes the auxiliary boost switches. This is standard logic technology. In accordance with some embodiments of the invention, switches 240, 270 can not operate unless the operator or machine is initiating a welding process. Initiation of a welding process involves a closing of a trigger switch. Until this switch is closed, the inverter or power source can operate to create a voltage across terminals 40, 50; however, the auxiliary boost circuit are not operable. These general uses are background to the detail logic control as shown in FIG. 6.

Turning now to the detail logic scheme in FIG. 6 switch 360 is closed when there is a welding process to direct true logic from line 362 to lines 364, 366. Line 364 forms one input to AND gate 380. The other input is the arc existence logic on line 292, as previously described. If there is an arc, a logic 1 or true logic appears on line 292. By closing trigger switch 360 the welding process is started. Current then is caused to flow to create a logic 1 or true logic on line 292. A true logic appears on output 382 of gate 380. This true logic starts time delay device 384 having a time delay of 1-5 ms. When device 384 times out, a logic 1 or true logic appears in output line 386, which line is connected to SET terminal 392 of flip flop 390. This sets the flip flop to a logic 1 producing a logic 1 or true logic in output line 396. Thus, the output of AND gate 370 is true or a logic 1. This logic in line 372 is directed to enable terminals 350a, 352a of logic devices 350, 352. Thus, gates 350 and 352 are enabled to operate, as described in connection with the output stage or circuits of FIGS. 1-5. The logic control aspect of the invention as shown in FIG. 6 assures that the auxiliary boost switches do not operate until there is a commanded welding operation. Then the control operates switches 240, 270 with switches 80, 82 when there is no arc. By providing inverter gate 400 in line 366, trigger switch 360 is opened to place a logic 0 or not true logic on line 366. Inverter gate 400 then produces a logic 1 or true logic on output line 402 connected to RESET terminal 394 of flip flop 390. This resets the flip flop to a logic 0 or not true logic on line 396. This deactivates gate 370 and disables gates 350, 352. Thus, when trigger switch 360 is closed, there is a slight delay and then the auxiliary switches 240, 270 can be used. This assures that the auxiliary boost circuits are not used, except during a welding process.

Figure 7:
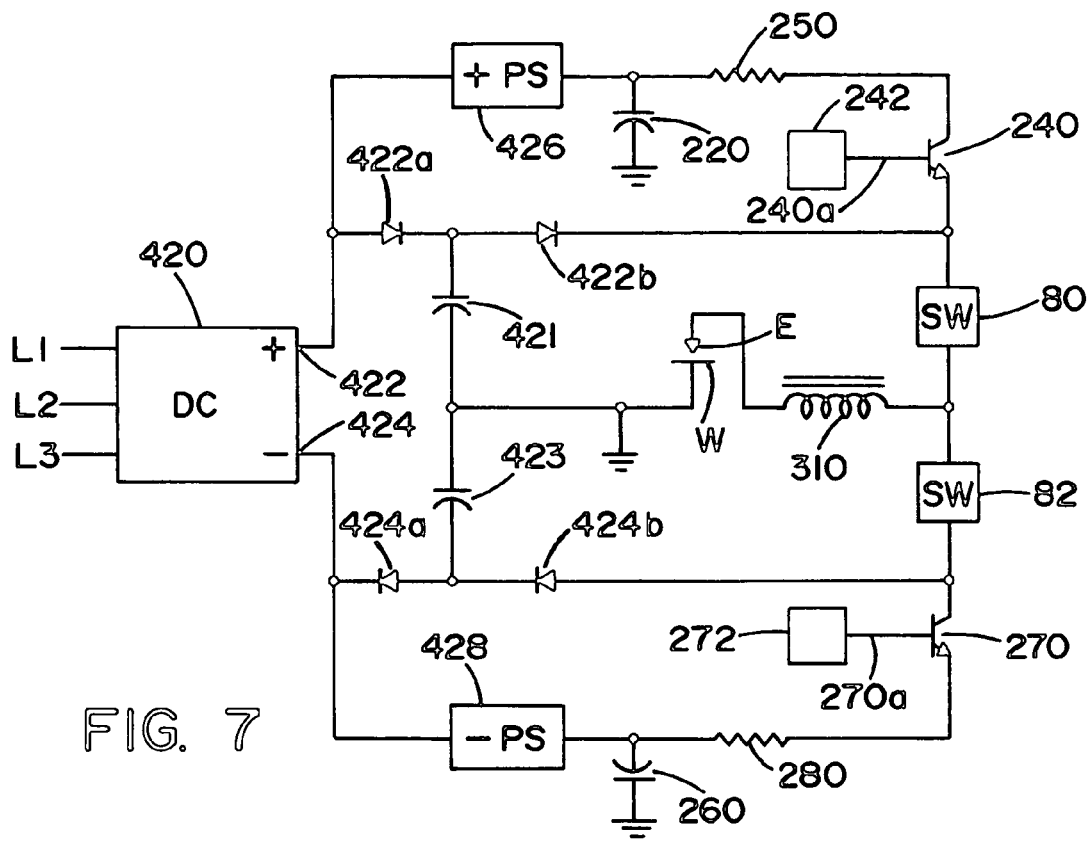
FIGS. 7-9 are embodiments of the invention converting output circuits in Stava U.S. Pat. No. 6,365,874 to circuits using the present invention.
Figure 8:
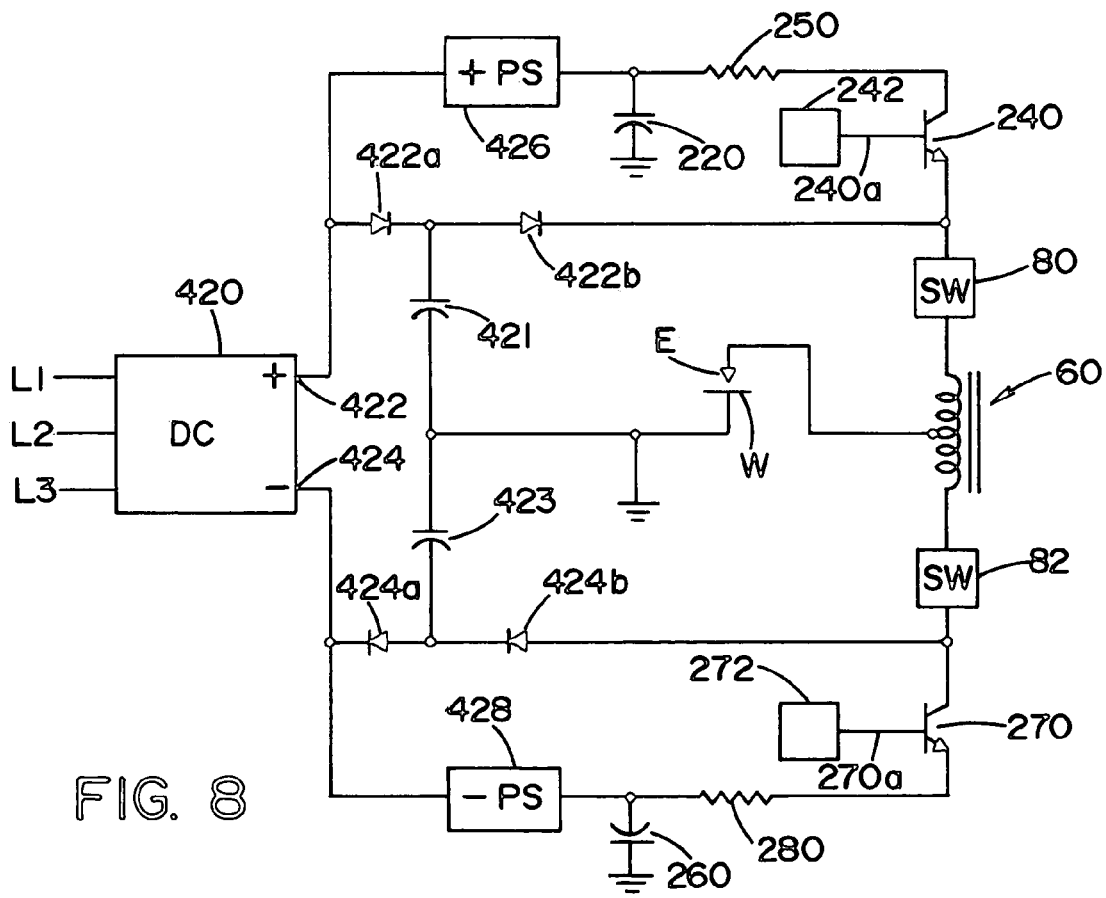
Figure 9:
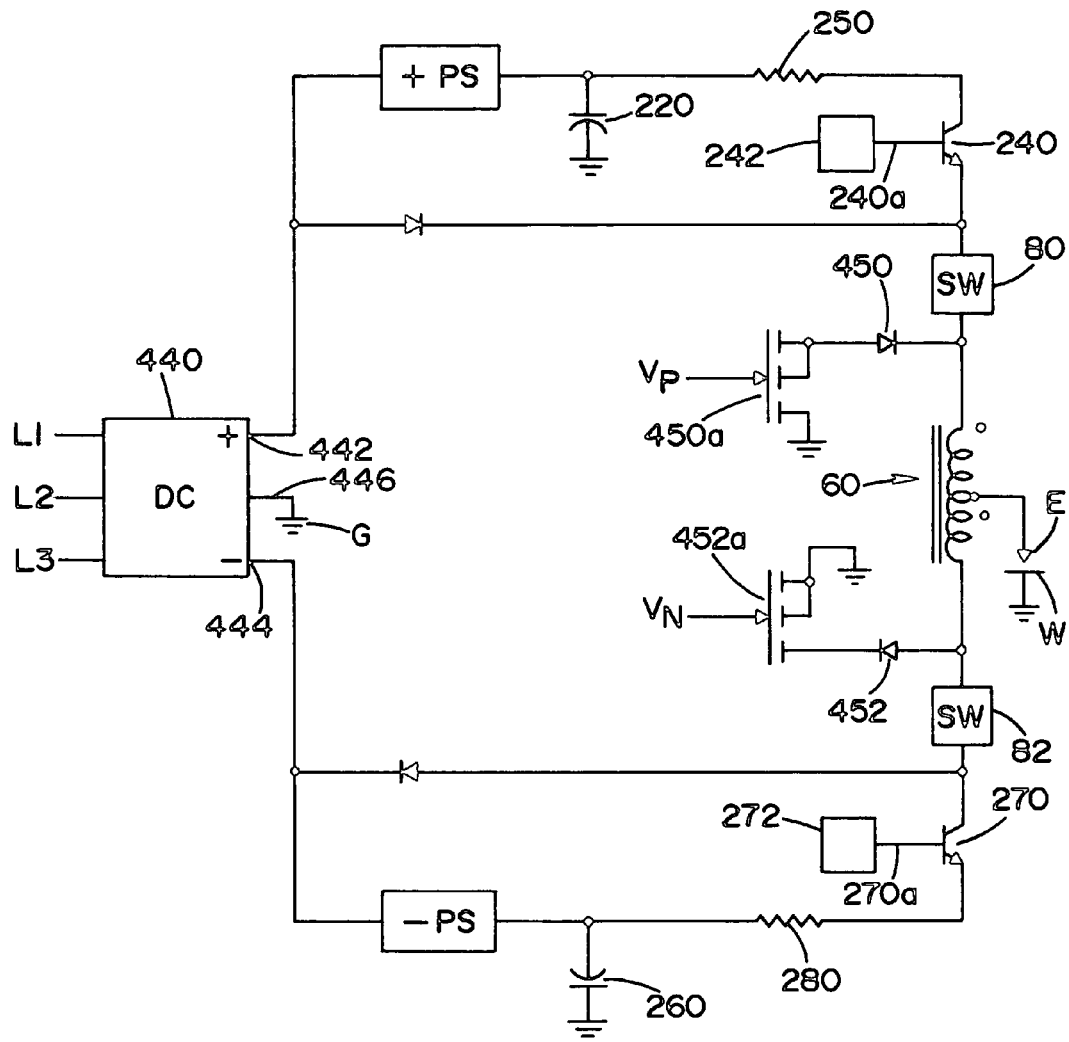
Figure 10:
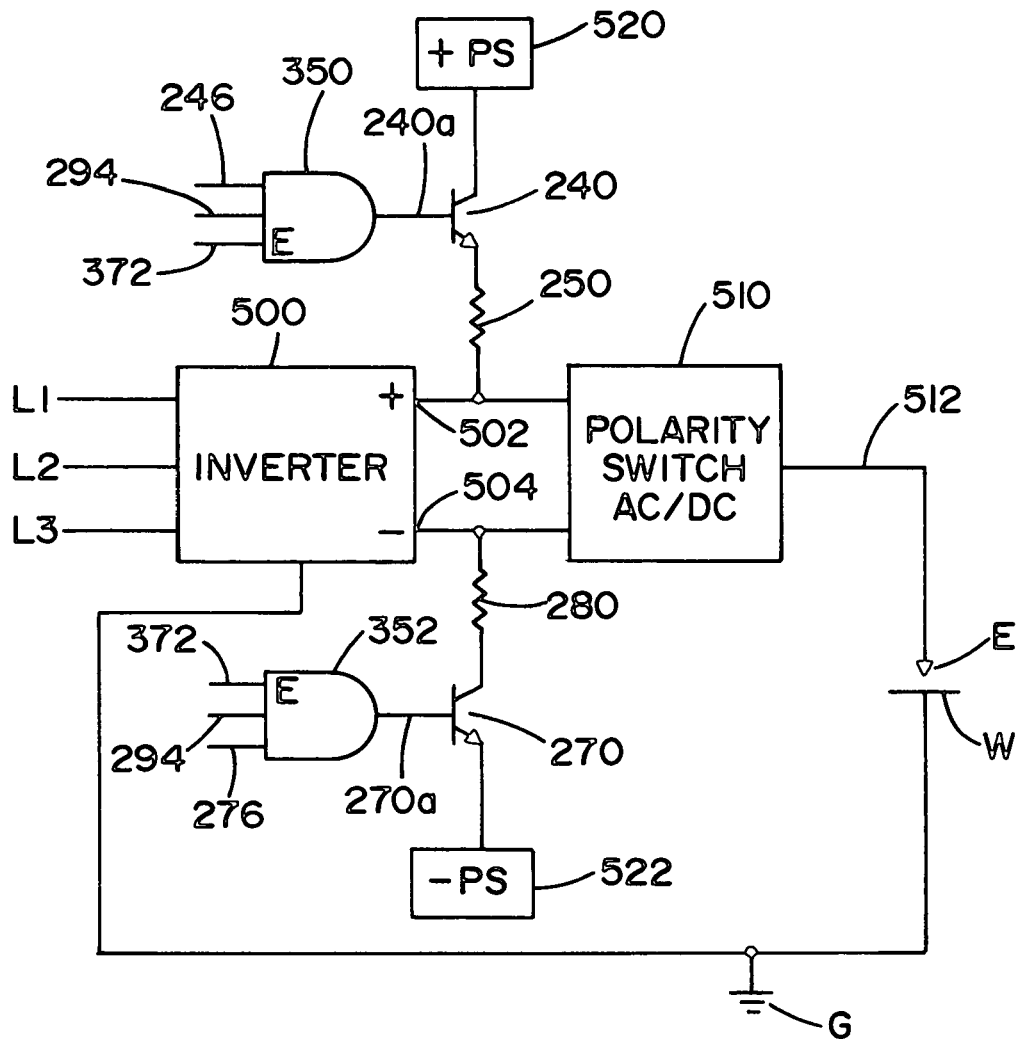
FIG. 10 is a block diagram of a simplified showing of the invention utilizing a standard inverter with a standard polarity switch to perform AC welding or DC welding.

The invention of adding an open circuit voltage auxiliary boost circuit to an AC output stage has universal application. To illustrate the fact, reference is made to Stava U.S. Pat. No. 6,365,874 wherein the AC output circuits shown in FIGS. 7, 8 and 9 are illustrated generically. A DC power source 420 has positive voltage and negative voltage output terminals 422, 424, as shown in FIGS. 7 and 8. The main output circuit includes diodes 422a, 422b and diodes 423a, 423b connected by series capacitors 421, 423 attached to grounded workpiece W. An auxiliary boost high voltage supply 426 is added to the positive side of the main output circuit using the same components of the present invention, as previously discussed. High voltage source 428 is added to the negative side of the output stage or circuit. Thus, the present invention is conveniently added to existing AC output circuits driven by generic DC power sources, such as source 420. In FIG. 9, a power source, such as shown in FIG. 1, is used with a generic output circuit disclosed in Stava U.S. Pat. No. 6,365,874 to perform an AC welding process. This known AC output circuit includes free wheeling diodes 450, 452 with control gate 450a, 452a, respectively. These gates are operated during the positive and negative polarity operation of the output circuit. In the positive half cycle or positive current portion, switch 450a is conductive. This inserts free wheeling diode 450 into the circuit. During a negative half cycle or negative current portion, switch 452a is conductive to insert free wheeling diode 452 into the circuit. Power source 440 has a positive voltage terminal 442, negative voltage terminal 444 and ground terminal 446, as explained in connection with the power source driving welder A in FIG. 1. This known circuit is provided with positive high voltage source 426 and the negative high voltage source 428 to incorporate the novel concept of the present invention into the known output AC circuit of the prior art. FIGS. 7-9 are illustrative in nature and illustrate how and why the present invention can be applied to various types of AC output circuits for increasing, selectively, the open circuit voltage to stabilize the arc, especially during low current operation. Universal application of the present invention is schematically illustrated in FIG. 10. A standard inverter 500 has output voltage terminals 502, 504 directed to a standard polarity switch 510 having an output line 512. When the polarity switch is shifted to the positive DC position, electrode E is electrode positive during the DC welding operation. Switch 510 can be shifted to the negative polarity position where a negative polarity is applied to output line 512 so electrode E remains electrode negative. By using a controller, such as controller 90 shown in FIG. 1, polarity switch 510 can be alternated between positive and negative to create an AC welding operation in line 512. This generic inverter type power source with an output polarity switch for AC and DC operation can be easily retrofilled to use the invention. Positive voltage source 520 and a negative voltage source 522 are selectively added to the voltages on terminals 502, 504, respectively, by closing auxiliary boost switches 240, 270 as previously described. These auxiliary switches are coordinated with polarity signal on line 512 by the logic on lines 246, 276. The invention can be use of only boost switch 240 when polarity switch 510 is set for a DC positive welding mode. In a like manner, boost switch 270 is used when polarity switch 510 is set for a DC negative welding mode. Indeed, the positive auxiliary boost circuit can be added to a standard chopper based welder to boost the OCV available for welding in the normal DC positive chopper mode. In the use of a chopper for DC negative welding the negative auxiliary boost circuit is added to use the present invention.

As can be appreciated when considering the showings of FIGS. 7, 8, 9 and 10, the present invention can be used with any number of output circuits for AC and/or DC welding by a power source having a positive voltage level and a negative voltage level. In the embodiments of FIGS. 1-5 and 9, the invention is particularly applicable to center grounded output circuits. These various illustrations are representative in nature and do not limit the extent of the universal use of the present invention.

Figure 11:
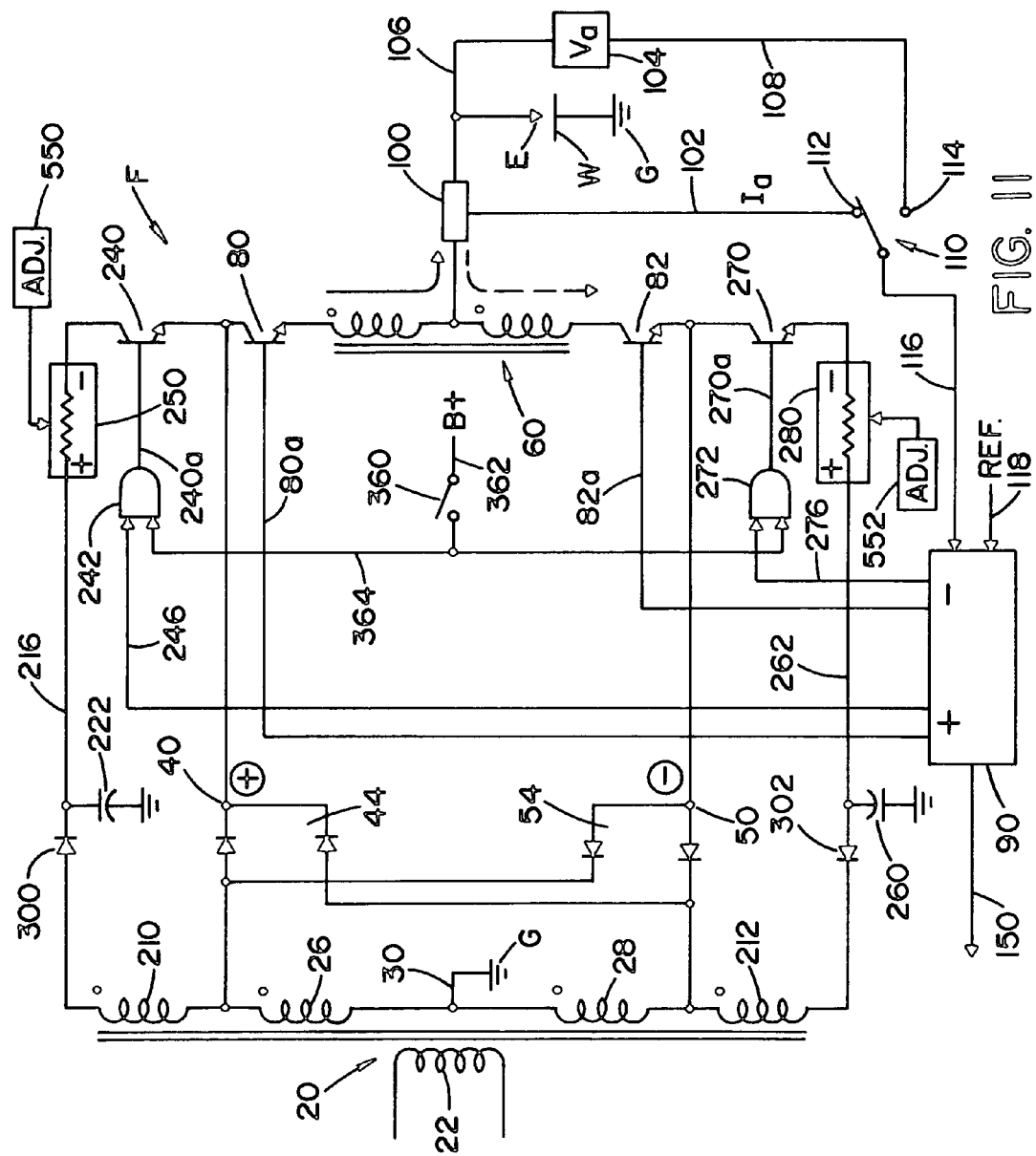
FIG. 11 is a wiring diagram showing a yet another embodiment of the present invention.

Yet another slight modification of the invention is illustrated in FIG. 11 wherein output stage, converter or circuit F is essentially the same as the prior output stage embodiments B, B', C and D. In this embodiment, logic devices 242, 252 are controlled only by trigger switch 360. When this switch is closed, the logic devices are enabled. When it is open, the logic devices are disabled. Thus, the auxiliary boost circuits are selectively energized during the positive and negative portions of the AC welding process, irrespective of the existence or non-existence of an arc. This selective operation is applicable to the DC welding mode. Furthermore, circuit F provides adjusting mechanisms 550, 552 for current controlling resistors 250, 280, respectively. In this manner, either manually or by a program in control 90, the low magnitude of the current available from the auxiliary boost circuit is optimized. This feature is advantageous in certain welding processes. Indeed, the amount of current during the positive and negative polarity operation of circuit F can be different by changing the adjustment of the current limiting resistors. Circuit F operates in accordance with the operating procedure explained for the various components labeled with the same numbers throughout this disclosure. Circuit F in FIG. 11 is further modified in a manner schematically represented in FIG. 12. Output stage or circuit F' includes logic device 242a and a logic device 272a which devices are energized upon closing of trigger switch 360. Thus, the closing of the trigger switch 360 immediately closes auxiliary boost switches 240, 270. These switches remain closed during the operation of welder A. There is a minor modification of circuit F shown in FIG. 11 wherein the switches are closed only when the appropriate polarity is being processed by the output stage or output circuit.

The invention is broadly the addition of a voltage boost, schematically represented as auxiliary source 600 in FIG. 13, to the positive and negative sides of an output control circuit used in electric arc welding. Auxiliary voltage source 600, which in practice is greater than 100 volts and is illustrated in FIG. 12 as being 150 volts, is connected through a series resistor 607 and a switch 604 to the positive output of the standard power source. The same addition is made to the negative output of a standard power source. In accordance with the invention, the current of the voltage source is limited by resistor 602 and is selectively activated by controller 606. Various control schemes for use in the boost source 600 are illustrated in FIGS. 14A, 14B, and 14C. In FIG. 14A, switch 604 is closed during the positive polarity of the output circuit when there is no arc and the trigger switch is closed as discussed in FIG. 10. In FIG. 14B, switch 604 is closed whenever there is no arc during the welding process. In FIG. 14C, whenever the trigger switch is closed, switch 604 is activated or closed. FIGS. 12, 13, 14A, 14B and 14C illustrate several control mechanisms for gating switches 240, 270. The auxiliary boost circuits of the invention are selective and are not passive for merely increasing the OCV of the main power source.

The various modifications can be combined in a variety of architectures to employ the invention in many environments obvious from the general description of the invention. The control and controllers are normally digital and software operated with the controllers being generally microprocessor based. Other analog and digital control and controller technology can be used.

Having thus defined the invention, the following is claimed:

1. A converter for the output of an electric arc welder for welding at a gap between an electrode and a workpiece when a trigger switch is activated, said converter having a first input terminal with a positive voltage having a first magnitude and a first amperage range; a second input terminal with a negative voltage having a second magnitude and a second amperage range; an auxiliary positive voltage supply with a positive voltage substantially greater than said first voltage and a positive current drastically less than said first amperage; an auxiliary negative voltage supply with a negative voltage substantially greater than said second voltage and a negative current drastically less than said second amperage; a first switch connecting said first terminal across said gap; a second switch for connecting said second terminal across said gap; a polarity control device for alternately operating said first and second switches to produce an AC welding current across said gap; a third switch for adding said auxiliary positive voltage to said positive voltage; a fourth switch for adding said auxiliary negative voltage to said negative voltage; and, a switch control device activated to selectively enable said third and fourth switches for operation in unison with said first and second switches, respectively.

2. A converter as defined in claim 1 wherein said switch control device is activated when said trigger is activated.

3. A converter as defined in claim 2 including a time delay circuit for delaying activation of said switch control device after said trigger is activated.

4. A converter as defined in claim 3 wherein said delay is at least 1.0 ms.

5. A converter as defined in claim 2 wherein said positive voltage and negative voltage is generated by first and second sections of a secondary winding of an input transformer.

6. A converter as defined in claim 5 wherein said auxiliary positive voltage supply is an auxiliary winding of said secondary winding separate from said first and second sections and said auxiliary negative voltage supply is an auxiliary winding section of said secondary winding separate from said first and second sections.

7. A converter as defined in claim 6 wherein said auxiliary sections both include the same winding section or sections.

8. A converter as defined in claim 5 including a center tapped choke with a first section connected between said first input terminal and said gap and a second section connected between said second terminal and said gap.

9. A converter as defined in claim 5 including a choke in series between said gap and both of said first and second terminals.

10. A converter as defined in claim 2 including a center tapped choke with a first section connected between said first input terminal and said gap and a second section connected between said second terminal and said gap.

11. A converter as defined in claim 2 including a choke in series between said gap and both of said first and second terminals.

12. A converter as defined in claim 1 wherein said switch control device is activated when there is no welding current in said gap.

13. A converter as defined in claim 5 wherein said positive voltage and negative voltage is generated by first and second sections of a secondary winding of an input transformer.

14. A converter as defined in claim 13 wherein said auxiliary positive voltage supply is an auxiliary winding of said secondary winding separate from said first and second sections and said auxiliary negative voltage supply is an auxiliary winding section of said secondary winding separate from said first and second sections.

15. A converter as defined in claim 14 wherein said auxiliary sections both include the same winding section or sections.

16. A converter as defined in claim 13 including a center tapped choke with a first section connected between said first input terminal and said gap and a second section connected between said second terminal and said gap.

17. A converter as defined in claim 13 including a choke in series between said gap and both of said first and second terminals.

18. A converter as defined in claim 12 including a center tapped choke with a first section connected between said first input terminal and said gap and a second section connected between said second terminal and said gap.

19. A converter as defined in claim 12 including a choke in series between said gap and both of said first and second terminals.

20. A converter as defined in claim 1 wherein said positive voltage and negative voltage is generated by first and second sections of a secondary winding of an input transformer.

21. A converter as defined in claim 20 wherein said auxiliary positive voltage supply is an auxiliary winding of said secondary winding separate from said first and second sections and said auxiliary negative voltage supply is an auxiliary winding section of said secondary winding separate from said first and second sections.

22. A converter as defined in claim 21 wherein said auxiliary sections both include the same winding section or sections.

23. A converter as defined in claim 20 including a center tapped choke with a first section connected between said first input terminal and said gap and a second section connected between said second terminal and said gap.

24. A converter as defined in claim 6 including a choke in series between said gap and both of said first and second terminals.

25. A converter as defined in claim 1 including a center tapped choke with a first section connected between said first input terminal and said gap and a second section connected between said second terminal and said gap.

26. A converter as defined in claim 1 including a choke in series between said gap and both of said first and second terminals.

27. A converter as defined in claim 1 wherein said positive current and negative current is controlled by a resistance to a level of less than 10 amperes.

28. A converter as defined in claim 1 wherein said positive current and negative current is controlled to a range of 1-5 amperes.

29. An output stage for the power source of an electric arc welder for performing a welding process between an electrode and a workpiece, when a trigger switch is closed, said output stage comprising: a first polarity circuit in series with said electrode and workpiece, said first circuit including a first main power supply with a first main voltage and a first main switch operated by a first switch signal; a second polarity circuit in series with said electrode and said workpiece, said second circuit including second main power supply with a second main voltage and a second main switch operated by a second switch signal; an AC controller for alternately creating said first and second switch signals to perform an AC welding process between said electrode and said workpiece; an auxiliary first polarity circuit including a first auxiliary voltage source additive to said first main supply and a first auxiliary switch in series with said first main switch and operated by a first boost signal; an auxiliary second polarity circuit including a second auxiliary voltage source additive to said second main supply and a second auxiliary switch in series with said second main switch and operated by a second boost signal; and a boost controller for selectively creating said first boost signal at least during said first switch signal and said second boost signal at least during said second switch signal.

30. An output stage as defined in claim 29 including a circuit to enable said boost signals only when said trigger switch is closed.

31. An output stage as defined in claim 30 including a sensor to sense an arc between said electrode and said workpiece and a circuit to enable said boost signals only when said sensor senses an arc.

32. An output stage as defined in claim 31 including a choke in said series with said electrode and workpiece.

33. An output stage as defined in claim 32 wherein said choke has a first section in said first polarity circuit and a second section in said second polarity sections with said first and second sections having a common core.

34. An output stage as defined in claim 30 including a choke in said series with said electrode and workpiece.

35. An output stage as defined in claim 34 wherein said choke has a first section in said first polarity circuit and a second section in said second polarity sections with said first and second sections having a common core.

36. An output stage as defined in claim 30 wherein said first and second auxiliary circuits include a resistor to limit current flow in said auxiliary circuits to a low level.

37. An output stage as defined in claim 36 wherein said low level is less than 10 amperes.

38. An output stage as defined in claim 36 wherein said resistor is adjustable.

39. An output stage as defined in claim 30 wherein said process is an AC TIG welding process.

40. An output stage as defined in claim 39 wherein said AC TIG welding process is performed at a current of less than about 10 amperes.

41. An output stage as defined in claim 30 wherein said process is an AC MIG or AC submerged arc welding process.

42. An output stage as defined in claim 41 wherein said AC MIG welding process is performed at a current more than 10 amperes.

43. An output stage as defined in claim 30 wherein said first and second auxiliary voltage sources are each a battery.

44. An output stage as defined in claim 30 wherein said first main power supply is one portion of the voltage across the output DC terminals of an inverter, said second main power supply is the remaining portion of the voltage across the output of said DC terminals of said inverter.

45. An output stage as defined in claim 44 wherein said first and second auxiliary voltage sources are separate DC voltage supplies.

46. An output stage as defined in claim 30 wherein said first and second main power supplies are each a DC output of an inverter between a positive terminal and a negative terminal, said first auxiliary voltage source is a positive voltage power supply connected by said first auxiliary switch to said positive terminal and said second auxiliary voltage source is a negative voltage power supply connected by said second auxiliary switch to said negative terminal.

47. An output stage as defined in claim 29 including a sensor to sense an arc between said electrode and said workpiece and a circuit to enable said boost signals only when said sensor senses an arc.

48. An output stage as defined in claim 47 including a choke in said series with said electrode and workpiece.

49. An output stage as defined in claim 48 wherein said choke has a first section in said first polarity circuit and a second section in said second polarity sections with said first and second sections having a common core.

50. An output stage as defined in claim 47 wherein said first and second auxiliary circuits include a resistor to limit current flow in said auxiliary circuits to a low level.

51. An output stage as defined in claim 50 wherein said low level is less than 10 amperes.

52. An output stage as defined in claim 50 wherein said resistor is adjustable.

53. An output stage as defined in claim 47 wherein said process is an AC TIG welding process.

54. An output stage as defined in claim 53 wherein said AC TIG welding process is performed at a current of less than about 10 amperes.

55. An output stage as defined in claim 47 wherein said process is an AC MIG or AC submerged arc welding process.

56. An output stage as defined in claim 55 wherein said AC MIG or AC submerged arc welding process is performed at a current more than 10 amperes.

57. An output stage as defined in claim 47 wherein said first and second auxiliary voltage sources are each a battery.

58. An output stage as defined in claim 47 wherein said first main power supply is one portion of the voltage across the output DC terminals of an inverter, said second main power supply is the remaining portion of the voltage across the output of said DC terminals of said inverter.

59. An output stage as defined in claim 58 wherein said first and second auxiliary voltage sources are separate DC voltage supplies.

60. An output stage as defined in claim 47 wherein said first and second main power supplies are each a DC output of an inverter between a positive terminal and a negative terminal, said first auxiliary voltage source is a positive voltage power supply connected by said first auxiliary switch to said positive terminal and said second auxiliary voltage source is a negative voltage power supply connected by said second auxiliary switch to said negative terminal.

61. An output stage as defined in claim 29 including a choke in said series with said electrode and workpiece.

62. An output stage as defined in claim 61 wherein said choke has a first section in said first polarity circuit and a second section in said second polarity sections with said first and second sections having a common core.

63. An output stage as defined in claim 61 wherein said first and second auxiliary circuits include a resistor to limit current flow in said auxiliary circuits to a low level.

64. An output stage as defined in claim 63 wherein said low level is less than 10 amperes.

65. An output stage as defined in claim 63 wherein said resistor is adjustable.

66. An output stage as defined in claim 29 wherein said first and second auxiliary circuits include a resistor to limit current flow in said auxiliary circuits to a low level.

67. An output stage as defined in claim 66 wherein said low level is less than 10 amperes.

68. An output stage as defined in claim 66 wherein said resistor is adjustable.

69. An output stage as defined in claim 66 wherein said process is an AC TIG welding process.

70. An output stage as defined in claim 69 wherein said AC TIG welding process is performed at a current of less than about 10 amperes.

71. An output stage as defined in claim 66 wherein said process is an AC MIG or AC submerged arc welding process.

72. An output stage as defined in claim 71 wherein said AC MIG or AC submerged arc welding process is performed at a current more than 10 amperes.

73. An output stage as defined in claim 66 wherein said first main power supply and said second main power supply are series sections of a secondary winding of an input transformer.

74. An output stage as defined in claim 73 wherein said first and second auxiliary voltage sources include auxiliary winding or windings on said input transformer.

75. An output stage as defined in claim 73 wherein said first and second auxiliary voltage sources are each a battery.

76. An output stage as defined in claim 73 wherein said first and second auxiliary voltage sources are each secondary windings of an auxiliary transformer.

77. An output stage as defined in claim 66 wherein said first main power supply is one portion of the voltage across the output DC terminals of an inverter, said second main power supply is the remaining portion of the voltage across the output of said DC terminals of said inverter.

78. An output stage as defined in claim 77 wherein said first and second auxiliary voltage sources are separate DC voltage supplies.

79. An output stage as defined in claim 66 wherein said first and second main power supplies are each a DC output of an inverter between a positive terminal and a negative terminal, said first auxiliary voltage source is a positive voltage power supply connected by said first auxiliary switch to said positive terminal and said second auxiliary voltage source is a negative voltage power supply connected by said second auxiliary switch to said negative terminal.

80. An output stage as defined in claim 29 wherein said process is an AC TIG welding process.

81. An output stage as defined in claim 80 wherein said AC TIG welding process is performed at a current of less than about 10 amperes.

82. An output stage as defined in claim 29 wherein said process is an AC MIG or AC submerged arc welding process.

83. An output stage as defined in claim 82 wherein said AC MIG welding process is performed at a current more than 10 amperes.

84. An output stage as defined in claim 29 wherein said first and second auxiliary voltage sources are each a battery.

85. An output stage as defined in claim 29 wherein said first main power supply is one portion of the voltage across the output DC terminals of an inverter, said second main power supply is the remaining portion of the voltage across the output of said DC terminals of said inverter.

86. An output stage as defined in claim 85 wherein said first and second auxiliary voltage sources are separate DC voltage supplies.

87. An output stage as defined in claim 29 wherein said first and second main power supplies are each a DC output of an inverter between a positive terminal and a negative terminal, said first auxiliary voltage source is a positive voltage power supply connected by said first auxiliary switch to said positive terminal and said second auxiliary voltage source is a negative voltage power supply connected by said second auxiliary switch to said negative terminal.

88. An output stage as defined in claim 87 wherein said inverter is a high switching speed inverter controlled by a number of control pulses with a frequency of at least 18 kHz.

* * * * *